United States Patent [19]

Hofmann

[11] 3,806,646

[45] Apr. 23, 1974

[54] NOISE PROCESSING SYSTEM AND METHOD FOR USE IN A TELEVISION RECEIVER

[75] Inventor: Judson A. Hofmann, Oak Park, Ill.

[73] Assignee: Zenith Radio Corporation, Chicago, Ill.

[22] Filed: Dec. 27, 1972

[21] Appl. No.: 318,959

Related U.S. Application Data

[63] Continuation-in-part of Ser. No. 288,181, Sept. 11, 1972, abandoned.

[52] U.S. Cl. .......................... 178/7.3 R, 178/DIG. 12

[51] Int. Cl. .......................................... H04n 5/52

[58] Field of Search ......... 178/7.3 R, 7.3 DC, 7.3 S, 178/7.5 R, 7.5 DC, 7.5 S, DIG. 12; 325/322, 323, 326, 473

[56] References Cited

UNITED STATES PATENTS

| | | | |
|---|---|---|---|
| 3,624,288 | 11/1971 | Hofmann | 178/DIG. 12 |
| 3,441,669 | 4/1969 | Janson et al. | 178/DIG. 12 |
| 3,182,123 | 5/1965 | Kao | 178/7.3 S |

FOREIGN PATENTS OR APPLICATIONS

| | | | |
|---|---|---|---|
| 250,345 | 3/1964 | Australia | 178/DIG. 12 |

*Primary Examiner*—Robert L. Richardson
*Assistant Examiner*—Jin F. Ng
*Attorney, Agent, or Firm*—Nicholas A. Camasto; John H. Coult; John J. Pederson

[57] ABSTRACT

This disclosure depicts methods and apparatus for processing noise in a television receiver having an AGC system. More specifically, there is disclosed in one embodiment a DC coupled noise processor for rendering the AGC (automatic gain control) system insensitive to noise pulses appearing in the composite video signal. The processor includes means for generating a noise gating pulse in response to each large amplitude noise pulse in the composite video signal and means for generating an override signal in response to every noise gating pulse whose duration exceeds a predetermined interval $t_d$. The override signal and noise gating pulse control the operation of the AGC system in a way which renders it unresponsive to the composite video signal for an interval no longer than $t_d$. In the presence of a short noise gating pulse whose duration is less than $t_d$, the AGC system is turned off for the entire duration of the pulse. In the presence of a wide noise gating pulse whose duration exceeds $t_d$, the AGC system is turned off only for the interval $t_d$; it then recovers in response to the override signal which was triggered by the wide noise pulse. In another embodiment, the noise processing system includes feedback means for desensitizing the system to minor fluctuations in the amplitude of the noise gating pulse. This feedback means also provides for the restoration of the video signal to its normal level following a lockout of the AGC system by a video signal overload.

12 Claims, 13 Drawing Figures

FIG. 4A
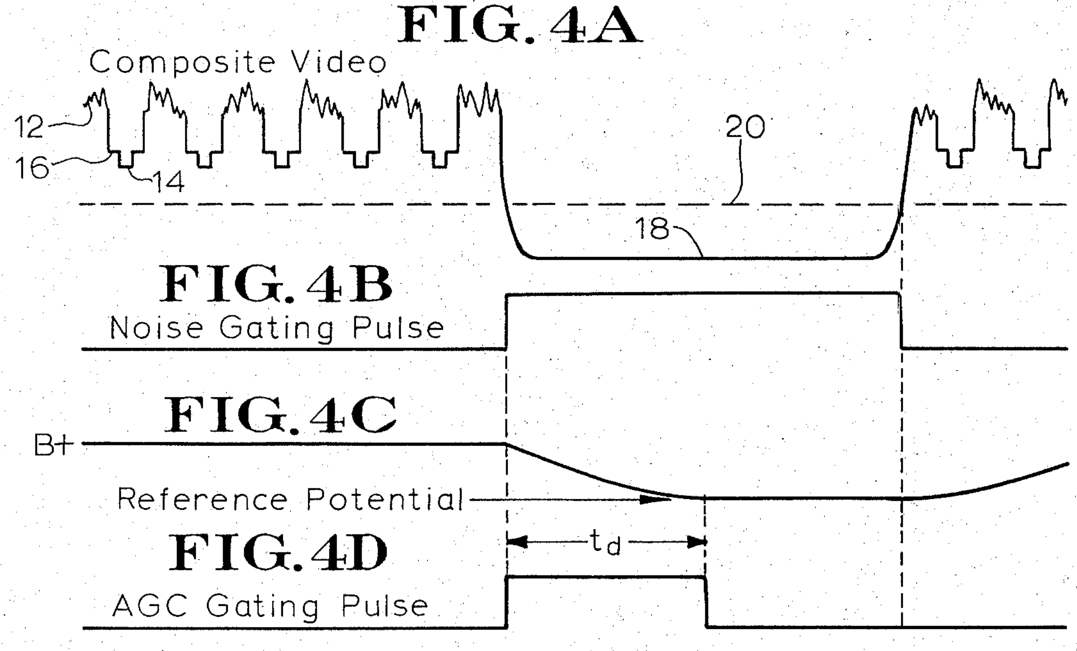
FIG. 4A, FIG. 4B, FIG. 4C, FIG. 4D
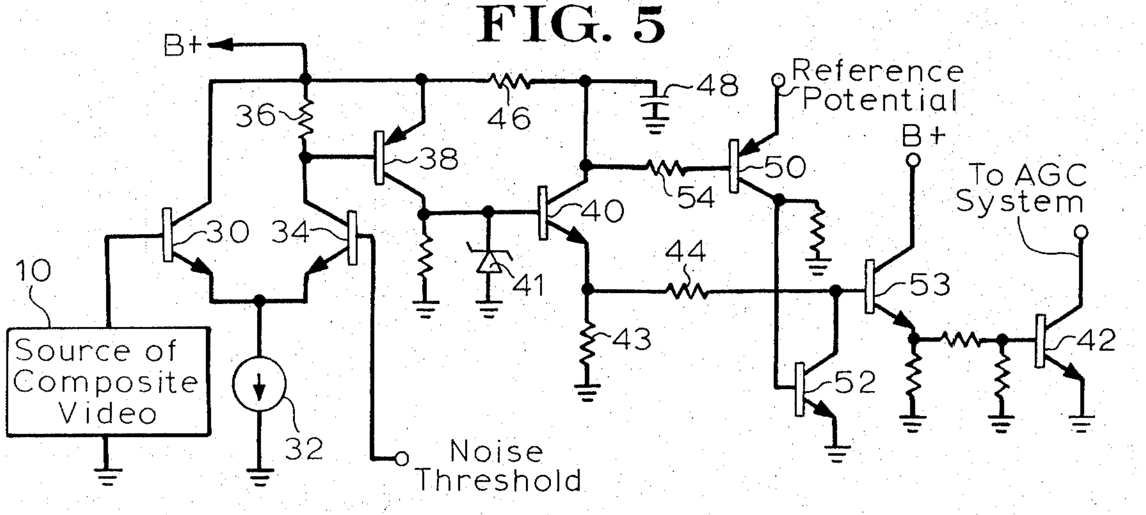
FIG. 5
FIG. 5A
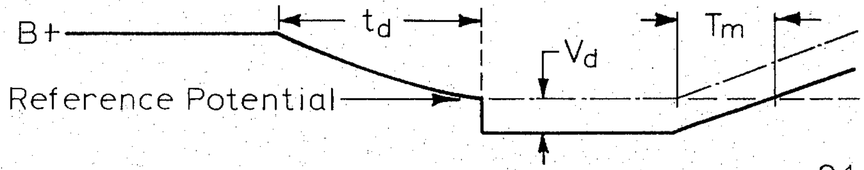
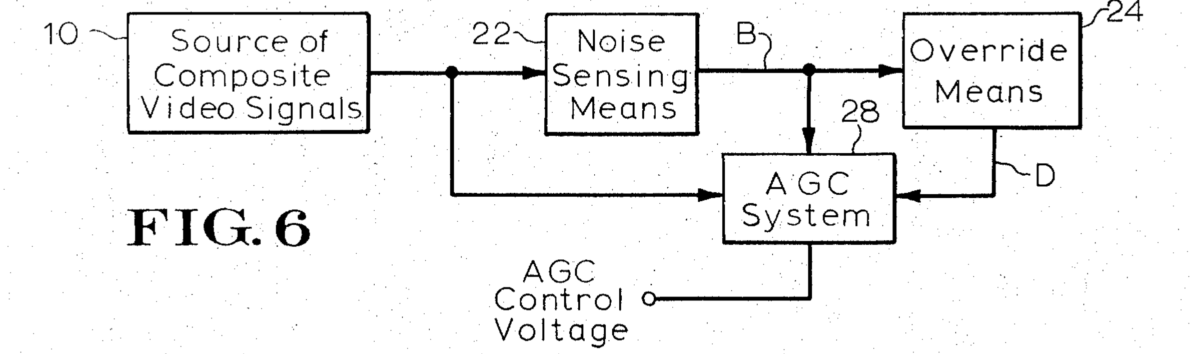
FIG. 6

NOISE PROCESSING SYSTEM AND METHOD FOR USE IN A TELEVISION RECEIVER

CROSS-REFERENCE TO RELATED APPLICATION

This application is a continuation-in-part of my co-pending U.S. Pat. application entitled DC COUPLED NOISE PROCESSING SYSTEM, Ser. No. 288,181, filed Sept. 11, 1972, now abandoned assigned to the assignee of the present application.

BACKGROUND OF THE INVENTION

This invention relates to a novel circuit for gating off the AGC system of a television receiver when impulse noise is present in the composite video signal.

Impulse noise has long been a problem in television receivers, being particularly upsetting to the sweep synchronization and AGC systems. The noise pulses are generally of much greater amplitude than the synchronizing components of the composite video signal. As a result, an AGC system which is allowed to sample these large amplitude noise pulses will develop an output control voltage which tends to rapidly decrease or back-off the gain of the IF amplifier. The result of this AGC back-off is an undesirably attenuated composite video signal.

One effect of this rapid attenuation in the composite video signal is a visible reduction in the contrast of the reproduced image for the duration of the back-off.

A second effect is an intermittent loss of synchronization which is even more serious. When a greatly attenuated composite video signal is applied to a conventional sync separator, the sync separator is unable to immediately respond to the attenuated video signal. The resultant loss of synchronization pulses at the output of the sync separator causes the vertical and horizontal sweep synchronization systems to become unlocked.

A well known method of minimizing the effects of impulse noise on AGC systems is to turn the AGC system off for the duration of the noise pulse. This prevents the AGC system from sampling the large amplitude noise pulses and consequently from developing an AGC output voltage which reduces the gain of the IF amplifier.

This type of noise processing for the AGC portion of a television receiver is well known in the art and is normally implemented in the following way. The amplitude excursions of the composite video signal are compared to a predetermined noise threshold voltage. Amplitude variations in the composite video signal which extend beyond this noise threshold are clipped off and used to generate a noise gating signal which turns the AGC system off. However, if the noise gating signal is effectively DC-coupled to the AGC system, a complete lockout of the video signal can result.

Consider the following sequence of events. First, the AGC system causes the IF amplifier and tuner to be in a high-gain mode; this is the normal condition of the tuner and IF amplifier when a very weak signal is being received or when the channel selector is between channels. If a large amplitude RF signal is then received by the tuner while it and the IF amplifier are in this high-gain mode, the output of the IF amplifier will consist of a composite video signal whose amplitude is limited only by the signal handling capability of the IF amplifier. This large composite video signal will surely exceed the noise threshold level, thereby generating a noise gating signal which turns the AGC system off. Since the AGC system is now off, it cannot generate the control voltage needed to cause the gain of the tuner and IF amplifier to be reduced. As long as the signal at the out-put of the IF amplifier remains large enough to exceed the noise threshold level, the system will be unable to recover from this signal overload.

A method which has been used to eliminate the lock-out problem described above is to capacitively couple the noise gating signal to the AGC system. This insures that the amplitude of the noise gating signal which is applied to the AGC system will decay with time according to the time constant associated with the capacitive coupling. When the amplitude of this noise pulse has decayed sufficiently, the AGC system will be allowed to turn on and sample the large amplitude composite video signal. An AGC control voltage will then be developed in response to this large amplitude composite video signal which will then reduce the gain of the tuner and IF amplifier.

In the light of recent efforts to fabricate the AGC and noise processing systems of television receivers using integrated circuit technology, it is evident that the use of a capacitor to couple the noise gating signal to the AGC system is disadvantageous. The value of the capacitor which is needed to pass the noise gating signals is too great for fabrication in integrated circuit form. Consequently, a discrete external coupling capacitor, connected to the integrated circuit by means of a pin for each end of the capacitor, is required. This use of two pins in an integrated circuit for nothing more than the connection of a coupling capacitor is clearly objectionable and costly. A preferred noise processing system would therefore be DC-coupled. In addition, it would embody provisions for overcoming the lockout problem normally associated with DC-coupled noise processing systems.

OBJECTS OF THE INVENTION

It is an object of this invention to provide a new and improved noise processing system for television receivers.

It is a more specific object of this invention to provide an improved noise processing system for the AGC portion of a television receiver which is DC coupled, thereby eliminating the need for capacitively coupling the noise gating signal to the AGC system while still retaining the advantages inherent in the capacitively coupled system.

It is another object of this invention to provide a DC-coupled noise processing system which will insure that the video signal is restored to its normal level following a temporary lockout of the AGC system by a video signal overload.

It is yet a further object of this invention to provide a noise processing system for the AGC portion of a television receiver which is suitable for fabrication in integrated circuit form.

BRIEF DESCRIPTION OF THE DRAWINGS

The features of this invention which are believed to be new are set forth with particularity in the appended claims. The invention, together with further objects and advantages thereof, may be best understood by reference to the following description in conjunction with the accompanying drawings in which like numbers refer to like elements and in which:

FIGS. 4A–4D depict the general nature of waveforms developed at certain points in the FIG. 3 system;

FIG. 5 is a schematic diagram which illustrates another embodiment of the system shown in FIG. I; FIG. 5A depicts the general nature of waveform at certain points in the FIG. 5 system; and FIG. 6 illustrates in block diagram form an alternative embodiment to that of FIG. 1 which also implements the principles and objects of this invention.

DESCRIPTION OF THE PREFERRED EMBODIMENT

Figure 1:
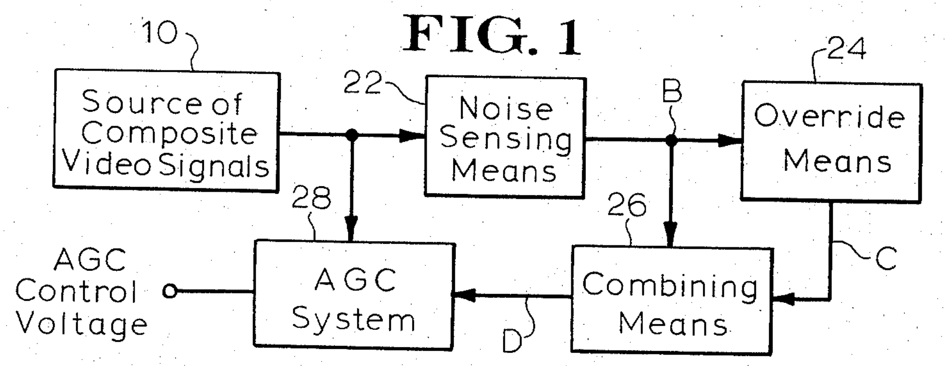
FIG. 1 illustrates in block diagram form a noise processing system for a television receiver implementing the principles of this invention.
Figures 2A, 2B, 2C, 2D:
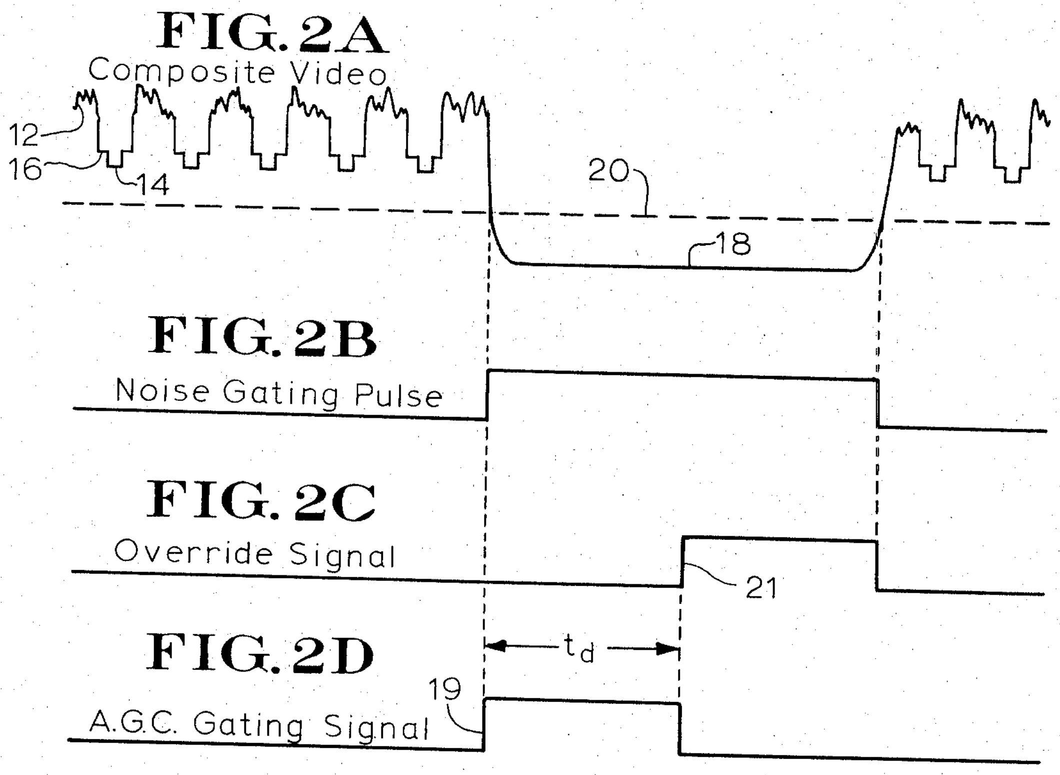
FIGS. 2A–2D depict the general nature of waveforms of typical signals developed at certain points of FIG. 1.

FIG. 1 illustrates a noise processing system which includes a source of a composite video signal 10 such as the video detector in a conventional television receiver. A typical composite video signal waveform is shown in FIG. 2A. The illustrated composite video signal contains the desired video components 12, horizontal synchronizing components 14 and blanking pedestal components 16, all of which vary within a predetermined amplitude range.

The composite video signal is subject to the inclusion of undesired extraneous noise components, such as represented by noise pulse 18 in FIG. 2A, which exceed the amplitude range of the desired signal components. Noise pulse 18 is shown as being one continuous pulse of arbitrary length, but it is also meant to represent any train of shorter duration noise pulses which the noise processing system might interpret as a single continuous pulse.

Dashed line 20 indicates the noise threshold level which demarcates (with some allowance for the necessary tolerances) the amplitude limit of the useful components of the composite video signal. Any signal components extending beyond this level are assumed to be noise pulses.

The composite video signal shown in FIG. 2A is coupled to noise sensing means 22 which distinguishes between noise pulses and the useful components of the video signal by comparing the entire composite video signal with the predetermined noise threshold level. When a noise pulse is present, noise sensing means 22 generates a noise gating pulse whose duration is related to the width of that part of the noise pulse which extends beyond the noise threshold level. This noise gating pulse appears at point B in FIG. 1 and is illustrated in FIG. 2B. This noise gating pulse is then coupled to override means 24 and to combining means 26.

Override means 24 generates override signals at point C, but only in response to those noise gating pulses having a duration greater than a predetermined AGC noise gating time interval $t_d$. Those override signals are delayed in time from the respective noise gating pulses which triggered them by an interval $t_d$, as shown in FIG. 2C. They are then coupled to combining means 26 as shown.

FIGS. 2A–D are, for purposes of clarity, drawn to show signals and pulses which exist for a small fraction of a television field. However, it is common for a noise pulse 18 to extend for a large fraction of a field or longer. The duration of noise gating interval $t_d$ is typically within the range of from one-tenth of a field to one complete field, a representative duration being one-half of a field time.

Combining means 26 combines the noise gating pulses and override signals to produce an AGC gating signal as shown in FIG. 2D. As shown, the AGC gating signal has a leading edge 19 which substantially coincides with the leading edge of the noise gating pulse and which terminates substantially coincidentally with the leading edge 21 of the override signal. This AGC gating signal appears at point D in FIG. 1 and is applied directly to AGC system 28 so as to render it unresponsive to the applied composite video signal for the duration of the gating signal.

If a noise gating pulse generated by noise sensing means 22 persists for a time which is less than $t_d$, no override signal will be generated by override means 24. In that case, the output of combining means 26 would be nearly identical to the noise gating pulse appearing at its input.

The operation of this system can be briefly summarized as follows: AGC system 28 is rendered unresponsive to the applied composite video signal for the entire duration of relatively narrow noise pulses, but in the presence of noise pulses wider than $t_d$, an override signal is generated which, when effectively combined with the noise gating pulse, produces an AGC gating signal whose duration is limited to $t_d$.

Figure 3:
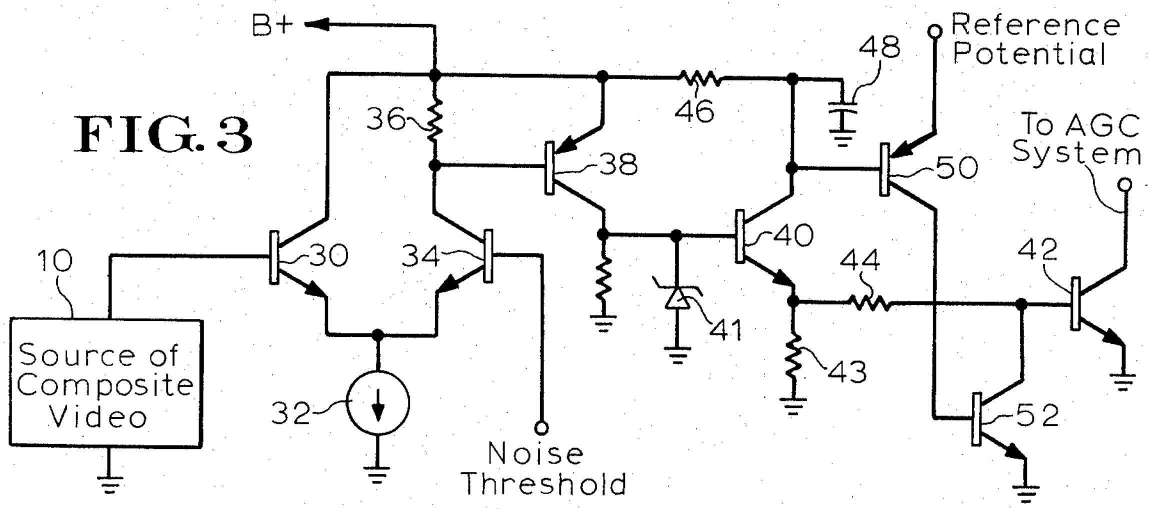
FIG. 3 is a schematic diagram which illustrates a preferred embodiment of the system shown in FIG. 1.

FIG. 3 illustrates a preferred implementation of the system shown in FIG. 1. The composite video signal waveform, as shown in FIG. 4A, is coupled to the base of transistor 30 which, along with a current source 32 and a second transistor 34, combine to form a differential amplifier. The base of transistor 34 is connected to a noise threshold voltage source. In the absence of impulse noise, transistor 34 is normally cut off. When a noise pulse arrives which extends beyond the noise threshold voltage level, transistor 34 conducts and develops a corresponding pulse across its collector resistor 36.

The voltage developed across resistor 36 in response to a noise pulse causes transistor 38 to conduct, thereby turning on transistor 40. Zener diode 41 ensures that the voltage applied to the base of transistor 40 is limited to the breakdown voltage of the zener. Since most noise pulses which exceed the noise threshold level are large enough to cause zener diode 41 to breakdown, the collector current of transistor 40 attains a predictable level for each such noise pulse.

The waveform shown in FIG. 4B illustrates the noise gating pulse which then appears at the emitter of transistor 40. This pulse is coupled to the base of AGC gating transistor 42 via resistor 44.

The waveform shown in FIG. 4C indicates that the voltage at the collector of transistor 40 is at or near B+ in the absence of large noise pulses. When transistor 40 is driven on, its collector voltage falls at an exponential rate determined by the time constant associated with resistor 46, capacitor 48, and the collector current of transistor 40.

The emitter of transistor 50 is coupled to a source of reference potential which biases its base-emitter junction off in the absence of noise gating pulses. If a noise pulse is wide enough to sustain conduction in transistor 40 for a predetermined period of time $t_d$, the voltage at the collector of transistor 40 will fall to a level, below the reference potential, at which transistor 50 will conduct. Transistor 52 is then driven into saturation, thereby clamping the noise gating pulse at the base of transistor 42 to ground. This effectively turns AGC gating transistor 42 off. The waveform shown in FIG. 4D illustrates the results of the preceding sequence of events.

A multitude of short duration noise pulses occuring sufficiently close together could also cause the collector voltage of transistor 40 to fall to the reference potential. In that case, the system would react as it does to one larger noise pulse. If the noise pulse which turned transistor 34 on was of short enough duration to prevent the voltage at the collector of transistor 40 from falling to a level which allows transistors 50 and 52 to conduct, the noise gating pulse which appears at the emitter of transistor 40 would be coupled intact to the base of AGC gating transistor 42.

It can be seen, therefore, that AGC gating transistor 42 is provided with a noise gating pulse for every noise pulse which exceeds the noise threshold level. However, the duration of the noise gating pulse is limited to a predetermined interval $t_d$ as established by the time constant associated with resistor 46, the collector current of transistor 40, and capacitor 48. The result is a noise processing system which turns the AGC system off in the presence of impulse noise which exceeds the noise threshold level while insuring that the AGC system is allowed to recover after a predetermined interval $t_d$.

It is to be understood that the above described method of restoring the AGC system after it has been turned off by a noise pulse is equally effective in restoring the AGC system after it has been turned off by a signal overload.

A variation on the noise processing system of FIG. 3 is shown in FIG. 5. Elements of the FIG. 3 and FIG. 5 systems having substantially the same structure and function are shown as having like reference numerals. The major difference between the two systems is that the FIG. 5 system includes a transistor 53 which acts as a buffer between the emitter of transistor 40 and the base of transistor 42. The effect of including a buffer at this point is to provide a controllable amount of feedback within the loop which includes transistors 40, 50 and 52. The reason for providing this feedback is to cause transistor 40 to experience an increase in its collector current immediately after the interval $t_d$ following a video signal over-load. As a result of this increase in its collector current, transistor 40 will exhibit a hysteresis-like effect which will desensitize it to minor fluctuations in the amplitude of its base voltage. An additional and more important result is that transistors 50 and 52 will remain on for a predetermined interval beyond the termination of a noise gating signal. This extended conduction time of transistors 50 and 52 will cause the AGC system to remain on for that predetermined interval in order to insure that the video signal is restored to its normal operating level. The desirability of including the feedback will become apparent following the discussion below, wherein the effects of the feedback and the manner in which it is produced are more fully described.

Assuming that a large signal overload has just occurred, a noise gating pulse will be generated by transistor 34 which will turn on transistors 38, 40, 53 and 42 in that order. At this time, the emitter current of transistor 40 is determined primarily by the voltage appearing at its base and its emitter resistor 43. The value of this emitter current in turn affects the level to which the collector voltage of transistor 40 will fall. After an interval $t_d$, transistors 50 and 52 will conduct in the manner previously described and transistor 52, upon becoming saturated, will effectively place the node to which its collector is coupled at ground potential or nearly so. The impedance now appearing at the emitter of transistor 40 is determined by the parallel combination of resistors 43 and 44. This reduced impedance allows the emitter current and therefore the collector current of transistor 40 to increase. This increase in the collector current of transistor 40 causes transistor 50 to conduct harder, thereby lowering the collector voltage of transistor 40 because of the increased voltage drops across resistor 54 and the base-emitter junction of transistor 50.

A result of this change in the collector current of transistor 40 is that a hysteresis-like effect is produced which desensitizes transistor 40 and the noise processing system to minor fluctuations in the amplitude of the voltage appearing on the base of transistor 40. That a hysteresis effect is actually produced becomes apparent when the operation of transistor 40 is analyzed.

The voltage at the base of transistor 40 is required to reach a certain minimum level V1 in order that its collector current reach an amplitude sufficient to cause conduction of transistors 50 and 52; however, once transistors 50 and 52 do conduct, the impedance in the emitter of transistor 40 is lowered, thereby increasing the collector current of transistor 40. We now have a larger collector current for the same unchanged voltage V1 at the base of transistor 40. This means that the transistor 40 base voltage can be lowered to a level V2 below V1 without turning transistors 50 and 52 off. Thus, we have a first voltage level V1 which is required to insure conduction of transistors 50 and 52, and a second lower voltage V2 below which the base voltage of transistor 40 must fall before transistors 50 and 52 are turned off. This enables the base voltage of transistor 40 to fluctuate between V1 and V2 without adversely affecting the conduction of transistors 50 and 52.

An additional important effect which results from the increased conduction of transistor 40 when transistor 52 begins to conduct may be most easily explained by first describing a problem which could exist when the feedback is removed. Referring now to FIG. 3, and assuming that a signal overload has occurred, transistor 42 will be turned on for an interval $t_d$ after which transistor 52 will conduct and turn transistor 42 off. The AGC system will then be activated and begin to recover from the overload condition by reducing the amplitude of the video signal. When the amplitude in the video signal has been reduced to the point where it is just beneath the noise threshold level, the voltage at the base of transistor 40 will decrease and turn off transistors 40 and 42. At this point, the voltage at the collector of transistor 40 will begin to rise exponentially toward B+. If fluctuations should now occur in the amplitude of the video signal, all or part thereof may extend beyond the noise threshold level. When this occurs, the voltage at the base of transistor 40 will rise and turn transistors 40 and 42 back on, thus rendering the AGC system unresponsive to the fluctuations in the amplitude of the video signal. However, since the collector voltage of transistor 40 had not had an opportunity to rise much beyond the point where transistor 50 was barely turned off, transistor 50 will not remain off as long as $t_d$, but will soon be turned on by the decreasing voltage at the collector of transistor 40. The conduction of transistor 50 will then cause transistor 52 to saturate and turn transistor 42 off. The AGC system has now been reactivated and will again attempt to reduce the amplitude of the video signal to its predetermined normal level. But if the small fluctuations in the amplitude of the video signal are still present when the AGC once again reduces the level of the video signal to a point beneath the noise threshold level, those small fluctuations can again cause all or part of the video signal to again extend beyond the noise threshold level and begin anew the process described above. Should the fluctuations in the amplitude of the video signal continue, the noise processing system and AGC system may continue to oscillate between the off and on states.

An effective way to avoid such oscillations between the off and on states is to force transistors 50 and 52 to remain on until the level of the video signal has been reduced beneath the noise threshold level all the way to its predetermined steady-state level. If transistors 50 and 52 are caused to remain on even when the amplitude of the video signal has been reduced to a level which is beneath the noise threshold level, the AGC system will remain on and continue to reduce the amplitude of the video signal until that signal reaches its normal predetermined level. The small fluctuations in the amplitude of the video signal which can occur during the critical time when the level of the video signal is between the noise threshold level and its normal predetermined level can be effectively prevented from turning the AGC system off, thus allowing it to remain responsive to video level fluctuations during that critical interval and to restore the video signal to its proper level. Once the video signal has been restored to its proper predetermined level, minor fluctuations in its amplitude will not cause it to extend beyond the noise threshold level and generate the oscillatory condition described above.

Assuming for purposes of explanation that the AGC system requires 100 microseconds to reduce the level of the video signal from the noise threshold level to its normal predetermined level, sustaining conduction in transistors 50 and 52 for that additional 100 microseconds will insure that the AGC system remains responsive to fluctuations in the signal level which occur during that interval. The addition of transistor 53 to the FIG. 3 system accomplishes this effect.

Referring again to FIG. 5 and assuming that a condition of lockout exists after the interval $t_d$, transistors 50 and 52 will conduct and cause the collector current of transistor 40 to increase because of the now reduced impedance at its emitter. This sudden increase in the collector current reduces the voltage at the collector of transistor 40 by the amount $V_d$ as depicted in FIG. 5A. The extent to which the collector voltage falls as a result of the increase of collector current has been exaggerated in FIG. 5A for purposes of clarity and explanation. At this point, the AGC system is turned on and begins to decrease the amplitude of the video signal toward its normal level. When the level of the video signal has been reduced beyond the noise threshold level, the voltage at the base of transistor 40 will drop, thereby turning transistor 40 off and allowing its collector voltage to rise exponentially toward B+. Because the collector voltage of transistor 40 is now lower by an amount $V_d$ that it would have been without the feedback provided by the addition of transistor 53, a longer time Tm will elapse before the collector voltage of transistor 40 rises beyond the reference potential, thus allowing transistor 50 to remain on longer. The collector voltage which exists without the increased conduction of transistor 40 is shown as a dashed line in FIG. 5A for purposes of comparison. In FIG. 5A, Tm has been greatly exaggerated for clarity. By the appropriate choice of values for resistors 44 and 54, Tm may be made equal to the 100 microseconds which were assumedly required for the level of the video signal to drop to its normal predetermined level from the noise threshold level. In this way, noise gate 42 remains off and allows the AGC system to fully recover without being turned off by minor signal fluctuations which occur immediately subsequent to the video signal level dropping beneath the noise threshold level.

FIG. 6 illustrates a variation on the system shown in FIG. 1. In FIG. 6, noise sensing means 22 and override means 24 operate as described in connection with FIG. 1. Noise gating pulses appear at point B and are coupled directly to AGC system 28 and override means 24. The override signal which is generated in response to a noise gating pulse of duration greater than $t_d$ appears at point D in FIG. 6. This over-ride signal is then coupled to AGC system 28 so as to negate the effects of that portion of the noise gating pulse which persists for a time greater than $t_d$. It is understood that AGC system 28 includes at least one active device which can be turned off or on by the noise gating pulses and override signals respectively. The relationship between the override signal and the noise gating pulse of FIG. 6 is similar to that shown between the signals of FIGS. 2B and 2C.

In the system of FIG. 6, the noise gating pulse may be thought of as turning AGC system 28 off in the presence of a noise pulse while the override signal turns AGC system 28 back on after an interval $t_d$, therefore insuring that this DC coupled noise processing system will allow the AGC system to be responsive to its applied composite video signal after the predetermined interval $t_d$.

Thus, it is apparent that there has been provided, in accordance with the invention, a DC coupled noise processing system that fully satisfies the objects as set forth above. While the invention has been described in conjunction with specific embodiments thereof, it is evident that many alternatives, modifications and variations will be apparent to those skilled in the art in the light of the foregoing invention. Accordingly, it is intended to embrace all such alternatives, modifications, and variations which fall within the spirit and scope of the appended claims.

I claim:

1. In a television receiver having an AGC system for developing an AGC control voltage in response to an applied composite video signal, a noise processing system comprising:

noise sensing means receiving said composite video signal for generating noise gating pulses in response to noise pulses in said composite video signal which extend beyond a predetermined noise threshold level, said noise gating pulses being caused to have a width which is related to the width of that part of said noise pulses which extends beyond said noise threshold level;

means coupled to said noise sensing means and responsive only to noise gating pulses having a duration greater than a predetermined time interval $t_d$ for generating an override signal delayed in time from the noise gating pulse which triggered it by $t_d$; and means receiving said noise gating pulse and said override signal and coupled to the AGC system for causing said AGC system to be unresponsive to the applied composite video signal for an interval initiating substantially coincidentally with the leading edge of said noise gating pulse and terminating, at the latest, substantially coincidentally with the leading edge of said override signal.

2. In a television receiver having an AGC system for developing an AGC control voltage in response to an applied composite video signal, a noise processing system comprising:

noise sensing means receiving said composite video signal for generating noise gating pulses in response to noise pulses in said composite video signal which extend beyond a predetermined noise threshold level, said noise gating pulses being caused to have a width which is related to the width of that part of said noise pulses which extends beyond said noise threshold level;

means for coupling said noise gating pulses to said AGC system to render it unresponsive to said applied composite video signal for an interval related to said width of said nosie gating pulse:

overriding means coupled to said noise sensing means and responsive only to noise gating pulses having a duration greater than a predetermined time interval $t_d$ for generating an override signal delayed in time from the noise gating pulse which triggered it by $t_d$, said override means including means for coupling said override signal to said AGC system so as to negate the effect on said AGC system of that portion of a noise gating pulse which persists for a period of time greater than $t_d$, thereby insuring that said AGC system is never rendered unresponsive to said applied composite video signal for a period of time greater than $t_d$.

3. A system as defined in claim 2 wherein said noise sensing means includes two emitter-coupled transistors connected in a differential amplifier configuration, means for applying said composite video signal to the base of one of said transistors, means for applying said noise threshold voltage to the base of the other of said transistors, an impedance coupled between the emitters of said transistors and a plane of reference potential, a collector impedance connected between the collector of one of said transistors and a potential source, and means for coupling the collector of the other of said transistors to said potential source, said noise threshold voltage having a level which allows conduction of one of said transistors only when a noise pulse extending beyond said noise threshold voltage level is present in said composite video signal, thereby generating a noise gating pulse across said collector impedance.

4. A system as defined in claim 2 wherein said overriding means includes an integrator, means for applying said noise gating pulse to said integrator to produce a delayed noise gating pulse whose leading edge rises at an exponential rate, means receiving said delayed noise gating signal for generating said override signal in response to a delayed gating pulse of a predetermined amplitude, the time constant of said integrator being chosen to insure that said delayed noise gating signal cannot reach said predetermined amplitude until after said interval $t_d$.

5. In a television receiver having an AGC system for developing an AGC control voltage in response to an applied composite video signal, a noise processing system comprising:

noise sensing means receiving said composite video signal for generating noise gating pulses in response to noise pulses in said composite video signal which extend beyond a predetermined noise threshold level, said noise gating pulses being caused to have a width which is related to the width of that part of said noise pulses which extends beyond said noise threshold level;

override means coupled to said noise sensing means and responsive only to noise gating pulses having a duration greater than a predetermined time interval $t_d$, for generating an override signal delayed in time from the noise gating pulse which triggered it by $t_d$; and combining means receiving said noise gating pulse and said override signal for developing an AGC gating signal for application to said AGC system to render said AGC system unresponsive to said applied composite video signal for an interval no longer than $t_d$ following any noise pulse.

6. A system as defined in claim 5 wherein said noise sensing means includes two emitter-coupled transistors connected in a differential amplifier configuration, means for applying said composite video signal to the base of one of said transistors, means for applying said noise threshold voltage to the base of the other of said transistors, an impedance coupled between the emitters of said transistors and a plane of reference potential, a collector impedance connected between the collector of one of said transistors and a potential source, and means for coupling the collector of the other of said transistors to said potential source, said noise threshold voltage having a level which allows conduction of one of said transistors only when a noise pulse extending beyond said noise threshold voltage level is present in said composite video signal, thereby generating a noise gating pulse across said collector impedance.

7. A system as defined in claim 5 wherein said means for generating said override signal includes an integrator, means for applying said noise gating pulse to said integrator to produce a delayed noise gating pulse whose leading edge rises at an exponential rate, and means receiving said delayed noise gating pulse for generating said override signal in response to a delayed gating pulse of a predetermined amplitude, the time constant of said integrator insuring that said delayed first noise gating signal cannot reach said predetermined amplitude until after said interval $t_d$.

8. A system as defined in claim 5 wherein said combining means includes a transistor having an emitter coupled to a plane of reference potential, a collector impedance serially coupling said noise gating pulse to the collector of said transistor, and means for coupling said override signal to the base of said transistor to turn said transistor on when only said override signal is present thereby developing said AGC gating signal between said collector and plane of reference potential.

9. In a television receiver having an AGC system for developing an AGC control voltage in response to an applied composite video signal, a noise processing system comprising:

noise sensing means receiving said composite video signal for generating noise gating pulses in response to noise pulses in said composite video signal which extend beyond a predetermined noise threshold level, said noise gating pulses being caused to have a width which is related to the width of that part of said noise pulses which extend beyond said noise threshold level;

override means coupled to said noise sensing means and responsive only to noise gating pulses having a duration greater than a predetermined time interval $t_d$ for generating an override signal delayed in time from the noise gating pulse which triggered it by $t_d$;

combining means receiving said noise gating pulse and said override signal for developing an AGC gating signal for application to said AGC system to render said AGC system unresponsive to said applied composite video signal for an interval no longer than $t_d$ following any noise pulse; and feedback means responsive to said override signal and coupled back to said override means for causing said override means to continue generating an override signal for an interval of predetermined duration following the termination of a noise gating pulse of duration greater than $t_d$, the duration of said predetermined interval being chosen to insure that the AGC system can restore the video signal to a level below said noise threshold level at which small fluctuations in the video signal level will not cause the AGC system to receive noise gating pulses.

10. A system as defined in claim 9, wherein said feedback means includes means for causing said override means to generate override signals in response to noise gating pulses of a first amplitude level and for causing said override means to terminate said override signal in response to noise gating pulses of a second lesser amplitude level, thus establishing a hysteresis effect whereby said override means is desensitized to fluctuations in the amplitude of said noise gating pulses, which fluctuations occur between said first and second amplitude levels.

11. A noise processing method for use in a television receiver having an AGC system which develops an AGC voltage in response to an applied composite video signal, comprising:

generating noise gating pulses in response to noise pulses in said composite video signal which extend beyond a predetermined noise threshold level, said noise gating pulses having a width which is related to the width of that part of said noise pulses which extends beyond said noise threshold level;

generating a control signal in response to every noise gating pulse whose duration exceeds a predetermined time interval $t_d$, said control signal being delayed in time from the noise gating pulse which triggered it by $t_d$; and coupling said control signal and said noise gating pulse to the AGC system so as to render said AGC system unresponsive to the applied composite video signal for an interval initiating substantially coincidentally with the leading edge of said noise gating pulse and terminating, at the latest, substantially coincidentally with the leading edge of said control signal.

12. A noise processing method for use in a television receiver having an AGC system which develops an AGC voltage in response to an applied composite video signal, comprising:

generating noise gating pulses in response to noise pulses in said composite video signal which extend beyond a predetermined noise threshold level, said noise gating pulses having a width which is related to the width of that part of said noise pulses which extends beyond said noise threshold level;

generating an override signal in response to every noise gating pulse whose duration exceeds a predetermined time interval $t_d$ and delayed in time from the noise gating pulse which triggered it by $t_d$;

combining said noise gating pulse and said override signal for generating an AGC gating signal whose leading edge is substantially coincident with the leading edge of said noise gating pulse and whose trailing edge is substantially coincident with the leading edge of said override signal; and applying said AGC gating signal to said AGC system so as to render said AGC system unresponsive to said applied composite video signal for the duration of said AGC gating signal.

* * * * *